United States Patent
Auer et al.

(10) Patent No.: US 11,129,013 B2
(45) Date of Patent: Sep. 21, 2021

(54) INSTANT ESIM TEST PROFILE GENERATOR

(71) Applicant: Google LLC, Mountain View, CA (US)

(72) Inventors: Tim Auer, Mountain View, CA (US); Jun Yin, San Jose, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/658,401

(22) Filed: Oct. 21, 2019

(65) Prior Publication Data
US 2021/0120399 A1    Apr. 22, 2021

(51) Int. Cl.
| H04W 8/18 | (2009.01) |
| H04W 4/18 | (2009.01) |
| H04W 12/40 | (2021.01) |
| H04L 9/32 | (2006.01) |

(52) U.S. Cl.
CPC ............ *H04W 8/183* (2013.01); *H04W 4/18* (2013.01); *H04L 9/3234* (2013.01); *H04W 12/40* (2021.01)

(58) Field of Classification Search
CPC ..... H04W 8/183; H04W 4/18; H04W 12/004; H04L 9/3234
See application file for complete search history.

(56) References Cited

U.S. PATENT DOCUMENTS

| 2007/0207798 A1* | 9/2007 | Talozi ................ H04W 24/06 455/423 |
| 2017/0013121 A1* | 1/2017 | Baeder ................ H04M 3/00 |
| 2019/0007835 A1* | 1/2019 | Li .................... H04L 9/0838 |

FOREIGN PATENT DOCUMENTS

DE    202015106611 U1    1/2016

OTHER PUBLICATIONS

Testing Remote SIM Provisioning, Solutions for M2M and Consumer Devices, Comprion Gmbh, Jan. 2018, 8 pp. (Year: 2018).*
Testing Remote SIM Provisioning, Solutions for M2M and Consumer Devices, Comprion GmbH, Jan. 2018, 8 pages.

(Continued)

*Primary Examiner* — Yuwen Pan
*Assistant Examiner* — Angelica M Perez
(74) *Attorney, Agent, or Firm* — Lerner, David, Littenberg, Krumholz & Mentlik, LLP (57) ABSTRACT

The present disclosure provides for creation of a test tool that uses publicly available SIM information to generate and load a test eSIM profile to eUICC. The test profile mirrors the non-sensitive network attach mechanisms for any given MNO to work in a predefined lab environment with network emulator. The test eSIM profile is not limited to use with to the SIM's specific OS and hardware. Rather, the eSIM profile package format is a publicly defined file format designed to be interoperable in all eUICC capable mobile devices. The test tool described herein may therefore eliminate bottlenecks and external dependencies faced by manufacturers and MNOs by allowing manufacturers and MNOs to validate profiles, networks, and devices for a wide variety of configurations.

11 Claims, 5 Drawing Sheets

(56) References Cited

OTHER PUBLICATIONS

Roberts, D. LS Announcing the publication of GSMA TS.48 Generic eUICC Test Profile for Device Testing. 3GPP Draft; TSG LS Announcing the Release of the GSMA Generic Test Profile V1.0, 3rd Generation Partnership Project (3GPP), Mobile Competence Centre; 650, Route Des Lucioles; F-06921 Sophia-Antipoli, May 13, 2019 (May 13, 2019), XP051735064. 3 pages. Retrieved from the Internet: <http://www.3gpp.org/ftp/Meetings%5F3GPP%5FSYNC/RAN5/Docs/R5%2D194737%2Ezip>.

John, J. et al. Report from the RAN WG5#83 Meeting. 3GPP Draft; R5-195505_EXR5-1 95424_MEETING_REPORT RAN5#83_ 1006, 3rd Generation Partnership Project (3GPP), Mobile Competence Centre ; 650, Route Des Lucioles; F-06921 Sophia-Antipolis Cedex; France vol. RAN WG5, no. Ljubljana, Slovenia; Aug. 26-30, 2019 Aug. 13, 2019 (Aug. 13, 2019), XP051773890, 199 pages. Retrieved from the Internet: <http://www.3gpp.org/ftp/tsg_ran/WG5_Test_ex-T1/TSGR5_84_Ljubljana/Docs/R5-195505.zip>.

International Search Report and Written Opinion for International Application No. PCT/US2020/042122 dated Oct. 7, 2020. 16 pages.

* cited by examiner

INSTANT ESIM TEST PROFILE GENERATOR

BACKGROUND

A subscriber identity module (SIM) for mobile communication devices contains many mobile network operator (MNO) specific parameters that the modem must use as part of the network attach procedure. The role of SIM can be divided into two distinct categories: security and network attach. With regard to security, cryptographic operations to authenticate SIM to network are executed internally inside the SIM and concealed from public sniffing. With regard to network attach, the SIM is a convenient place for MNOs to store public land mobile network (PLMN), network applications (USIM, ISIM, CSIM), SIM services, and other necessary functions that expedite the network attach procedure. Most of these procedures are standardized and publicly available information.

There are hundreds of MNOs in the world, large and small. Every network has their own SIM profile definition, and no two profiles are alike. This means every network has its own unique network attach procedure. This is a major challenge equipment manufacturers face as part of their device and application build qualification process.

Historically, an MNO test profile could be tested using "plastic roaming" with a pluggable physical SIM card. However, as the ecosystem embraces the concept of the eUICC and virtual eSIM profiles, these physical slots may begin to gradually disappear. Virtual MNO test profiles are not widely available. At best, only the largest and most well-known networks have the resources to define and widely distribute test profiles to manufacturers. However, for even the most well-known MNOs, it is impossible to efficiently obtain these profiles. In the rare situation where test profiles are available, it quickly becomes a scarce and tightly controlled resource, inaccessible to developers needing a profile to validate new features.

BRIEF SUMMARY

The present disclosure provides for creation of a test tool that uses publicly available SIM information to generate and load a test eSIM profile to a SM–DP+ server for eUICC. The test profile mirrors the non-sensitive network attach mechanisms for any given MNO to work in a predefined lab environment with network emulator. The test eSIM profile is not a proprietary file format and is not limited to use with the SIM's specific OS and hardware. Rather, the eSIM profile package format is a publicly defined file format designed to be interoperable in all eUICC capable mobile devices. The test tool described herein may therefore eliminate bottlenecks and external dependencies faced by manufacturers and MNOs by allowing manufacturers and MNOs to validate profiles, networks, and devices for a wide variety of configurations.

One aspect of the disclosure provides a system, including an input/output interface configured to couple to a first mobile communication device, and one or more processors. The one or more processors are configured to receive, from the first mobile communication device, an activity log of activity associated with a sequence of the first mobile communication device, extract, from the activity log, subscriber identity module (SIM) profile contents, and translate the SIM profile contents into an encoded file. The one or more processors may be further configured to output the encoded file to a test embedded universal integrated circuit card (eUICC), which may be installed on a second mobile computing device for testing.

The sequence may be, for example, a boot-up sequence or a network attach sequence. The activity log may include communications between a SIM and a baseband processor of the first mobile communication device.

Translating the SIM profile contents into an encoded file may include transposing SIM files on-top of a SIM Alliance profile. The one or more processors may be further configured to convert the encoded file into a publicly defined file format, such as a bound profile package (BPP).

Extracting the SIM profile contents may include parsing files of the activity log that permit read access. Parsing the files may include applying a predefined template to the activity log.

Another aspect of the disclosure provides method, including receiving, with one or more processors from the first mobile communication device, an activity log of activity associated with a sequence of the first mobile communication device, extracting, with the one or more processors, subscriber identity module (SIM) profile contents from the activity log, and translating, with the one or more processors, the SIM profile contents into an encoded file.

According to some examples, the method may further include outputting the encoded file to a test embedded universal integrated circuit card (eUICC). The sequence may be at least one of a boot-up sequence or a network attach sequence. Receiving the activity log may include listening to communications between a SIM and a baseband processor of the first mobile communication device. Translating the SIM profile contents into an encoded file may include transposing SIM files on-top of a SIM Alliance profile. The method may further include converting the encoded file into a publicly defined file format.

Extracting the SIM profile contents may include parsing files of the activity log permitting read access, such as by applying a predefined template to the activity log.

Yet another aspect of the disclosure provides a computer-readable medium storing instructions executable by one or more processors to perform a method, including receiving, from the first mobile communication device, an activity log of activity associated with a sequence of the first mobile communication device, extracting subscriber identity module (SIM) profile contents from the activity log, and translating the SIM profile contents into an encoded file. The encoded file may be output to a test embedded universal integrated circuit card (eUICC).

DETAILED DESCRIPTION

Overview

The technology relates generally to a testing tool to facilitate development and testing of mobile communication devices, such as mobile phones. The tool logs activities between a baseband processor and a subscriber identity module (SIM) card, such as in a text file. The tool parses the logged activity to extract SIM profile contents and translates the SIM profile's data into an encoded file, such as an Unprotected Profile Package (UPP). The UPP is then converted into a format that can be ingested by a server, such as a Subscription Manager–Data Preparation+(SM–DP+) server, thereby creating a test eSIM profile that can be loaded onto an embedded universal integrated circuit card (eUICC). The test eSIM profile mirrors the non-sensitive network attach mechanisms for any given mobile network operator to work in a predefined lab environment with network emulator. The eSIM profile package format is a publicly defined file format designed to be interoperable in all eUICC capable mobile devices.

The tool may be, for example, a server configured to communicate with a mobile device. For example, the server may gather the log data from a functioning mobile device that is known to function properly, and generate the test profile based on the log data. The test profile may then be used to test other devices that are not yet known to function properly, such as other mobile devices. For example, a device under test (DUT) may attempt bootup and attachment to a network using the test profile. If the DUT successfully attaches, the DUT may be considered to function properly. As another example, the test profile may be compared to a device profile of the DUT. If the test profile matches corresponding elements of the device profile of the DUT, the DUT may be considered to function properly.

The server and eSIM need to have a same certificate. Accordingly, test certificates are programmed into the eSIM. While eSIM and eUICC may be used interchangeably throughout this disclosure, it should be understood that the eSIM may include other types of embedded cards or profiles.

Creation of the test profile may include parsing the device SIM logs to yield a list of standardized SIM files. The standardized SIM files may be considered as profile elements in the UPP. For example, the standardized SIM files may be transposed on-top of a SIM Alliance profile to generate the UPP. The UPP is then converted into a format that can be received and interpreted by a server, such as a mobile network operator (MNO). For example, the UPP may follow the procedure defined by GSMA to convert the profile into BPP and then downloaded to eUICC as an issuer security domain—profile (ISD-P).

Every time a mobile communication device is turned on, it boots up and reads standard files used to attach to a network. Such files may include, for example, roaming information, general files defined by 3GPP or other standards organizations to attach to a 3G network or other types of network, etc. The tool will only parse standardized files with READ access condition fulfilled. Administrator PIN (ADM) protected files will not be read, and proprietary files will not be considered. Moreover, other files may be omitted or not read, as the AutoSIM profile template may not be an exhaustive list of all possible files defined in the given Application Directory file (ADF) specification. The resulting UPP will adhere to the SIM Alliance example profile and consider directory files (DF), ADFs, and applications, such as DF Master File, ADF USIM, ADF ISIM, ADF CSIM, DF PKCS #15, ARA-M application, ARA-D application, etc. In some examples, the UPP will also consider issuer security domain-root (ISD-R) and registry of applets loaded with dummy cap files and equivalent install parameters.

The tool may be used to standardize how device manufacturers and large network operators test mobile devices. It eliminates bottlenecks and external dependencies faced by OEMs and MNOs associated with test profiles. Doing so will enable OEMs and MNOs to validate profiles, networks, and devices for a wide variety of configurations.

Example Systems

Figure 1:
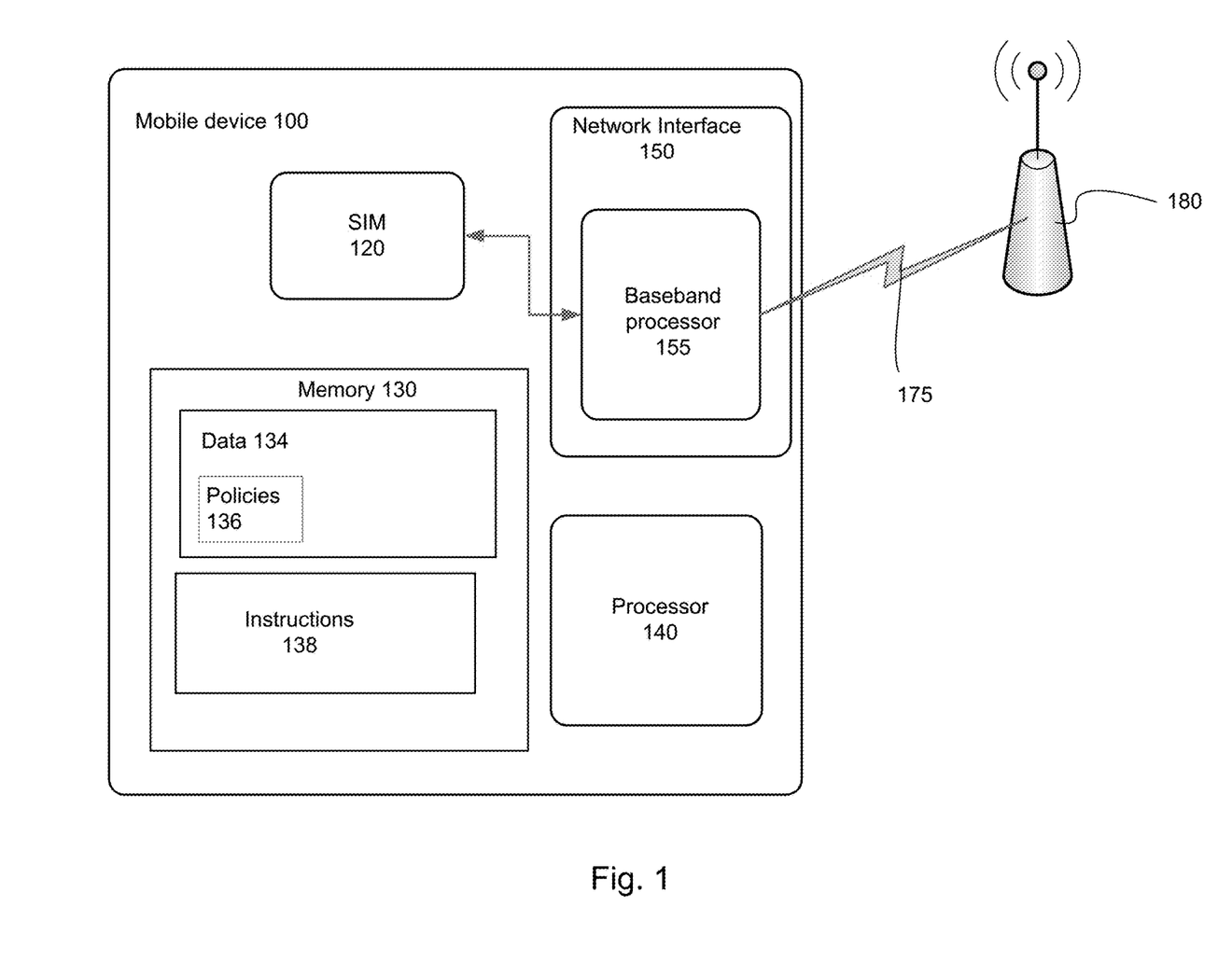
FIG. 1 is a block diagram of an example system according to aspects of the disclosure.

FIG. 1 illustrates an example mobile device 100. As the mobile device 100 boots up, SIM 120 communicates with baseband processor 155 of network interface 150. The SIM 120 further communicates with the baseband processor 155 as the mobile device 100 attaches to a network, such as by exchanging information 175 with a wireless access point 180. As discussed in further detail below in connection with FIG. 2, such communications between the SIM 120 and the baseband processor may be received by a server to create a test eSIM profile. In particular, the mobile device 100 and the SIM 120 maybe known to function properly. Use of the communications to create a test eSIM profile may be used to test other manufactured mobile communication devices, or devices under test (DUTs), to determine whether such DUTs are properly functioning in the same environment in which the SIM was previously used when the mobile device 100 attached to the network.

The mobile device 100 may be any type of mobile computing device, such as a smartphone, smartwatch, tablet, laptop, gaming system, or the like. The mobile device 100 may attach to one or more networks, and in some instances may be attached to multiple networks simultaneously. For example, the mobile device 100 may be connected to an MNO network, and also to small cell LTE network. Moreover, the mobile device 100 may also be coupled to one or more partner MNO networks.

The SIM 120 may be, for example, an electronic Universal Integrated Circuit Card (eUICC), an eSIM, a SoftSIM, or a secure element, etc. The SIM 120 may store subscription information for subscribing to one or more networks. The subscriptions may include, for example, authentication/authorization keys, identity of the subscriber, and profile information.

The network interface 150 may be a network interface card (NIC) or other type of network interface unit. The network interface 150 enables wireless communication with external devices, such as the access point 180, other mobile devices, or other network entities. The communication may utilize any of a variety of wireless protocols, such as IEEE 802.11, IEEE 802.16, Bluetooth, Bluetooth Low Energy, Wi-Fi, Lightweight Access Point protocol, etc. just as a few examples. The network interface 150 may further include one or more transmitters, receivers, and/or antennas for wireless communication.

The baseband processor 155 may control radio functions of the network interface 150. Such radio functions may include, for example, signal modulation, encoding, radio frequency shifting, etc. The baseband processor 155 may run a real-time operating system RTOS, or other operating system.

The communications between the SIM 120 and the baseband processor 155 during UICC activation may include select/read of the MF (Master File) and EF_DIR (elementary file Directory). These directories and their files contain non-telecom related procedures and references to Application Dedicated Files (ADF). The communications between the SIM 120 and the baseband processor 155 during Application Session Activation may include reading files specifically related to ADF's telecom application.

The mobile device 100 may further contain one or more additional processors, such as a main processor 140 separate from the baseband processor 155, memory 130 and other components typically present in mobile communication devices. The memory 130 can store information accessible by the one or more processors 140, including instructions 138 that can be executed by the one or more processors 140.

Memory 130 can also include data 134 that can be retrieved, manipulated or stored by the processor 140. The memory can be of any non-transitory type capable of storing information accessible by the processor, such as a hard-drive, memory card, RAM, DVD, write-capable, etc.

The instructions 138 can be any set of instructions to be executed directly, such as machine code, or indirectly, such as scripts, by the one or more processors. In that regard, the terms "instructions," "applications," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 134 can be retrieved, stored or modified by the one or more processors 140 in accordance with the instructions 138. Although the subject matter described herein is not limited by any particular data structure, the data can be stored in internal or external memory, computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data. According to some examples, the data 134 may include policies 136 or profiles for executing particular tasks, such as connecting to a network.

The one or more processors 140 can be any conventional processors, such as commercially available CPUs or microcontrollers. Alternatively, the processors can be dedicated components such as an application specific integrated circuit ("ASIC") or other hardware-based processor.

Figure 2:
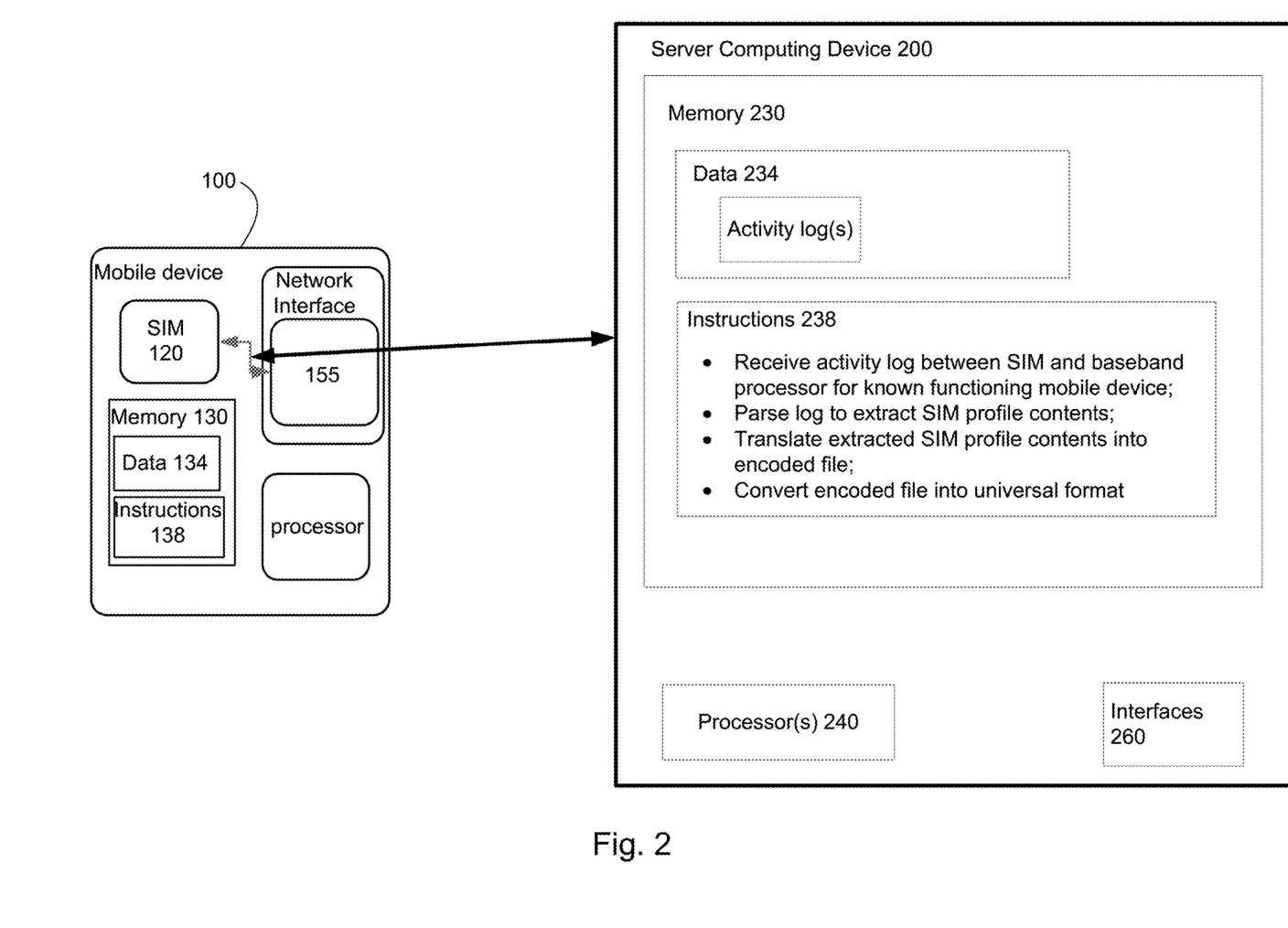
FIG. 2 is a block diagram of another example system according to aspects of the disclosure.

FIG. 2 illustrates a computing device 200, such as a server. The computing device 200 is configured to receive the communications between the SIM 120 and the baseband processor 155 of the mobile device 100. The computing device 200 extracts information from those received communications to generate the test eSIM profile. For example, the computing device 200 may extract SIM profile contents, translate the extracted SIM profile contents into an encoded file, and convert the encoded file into a universal format.

The device 200 may be any type of computing device or system of computing devices capable of communicating with the mobile device 100. For example, the computing device 200 may include one more interfaces 260, such as input/output, for communication with other devices such as the mobile device 100. Device 200 can contain one or more processors 240, memory 230 and other components typically present in general purpose computing devices. The memory 230 can store information accessible by the one or more processors 240, including instructions 238 that can be executed by the one or more processors 240.

Memory 230 can also include data 234 that can be retrieved, manipulated or stored by the processor 240. The memory can be of any non-transitory type capable of storing information accessible by the processor, such as a hard-drive, memory card, RAM, DVD, write-capable, etc.

The instructions 238 can be any set of instructions to be executed directly, such as machine code, or indirectly, such as scripts, by the one or more processors. In that regard, the terms "instructions," "applications," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 234 can be retrieved, stored or modified by the one or more processors 240 in accordance with the instructions 238. In one example, the data 234 may include one or more activity logs 235 corresponding to communications received from the mobile device 100. The activity log 235 may include, for example, a plurality of files used during boot-up and/or network attach. By way of example, such files may include a dedicated file (DF) Master File, Application DF (ADF) USIM, ADF ISIM, ADF CSIM, etc. Although the subject matter described herein is not limited by any particular data structure, the data can be stored in internal or external memory, computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The instructions 238 may provide for receiving communications, such as activity logs, between the SIM 120 and the baseband processor 155. The instructions 238 may further provide for parsing the activity log to extract SIM profile contents, translating the extracted contents into an encoded file, and converting the encoded file into a universal format to use in testing other devices, such as DUTs.

The one or more processors 240 can be any conventional processors, such as commercially available CPUs. Alternatively, the processors can be dedicated components such as an application specific integrated circuit ("ASIC") or other hardware-based processor. Although not necessary, the server 230 may include specialized hardware components to perform specific computing processes.

Although FIG. 2 functionally illustrates the processor, memory, and other elements of computing device 200 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 200. Accordingly, references to a processor, computer, computing device, or memory will be understood to include references to a collection of processors, computers, computing devices, or memories that may or may not operate in parallel. For example, the computing devices 200 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

Figure 3:
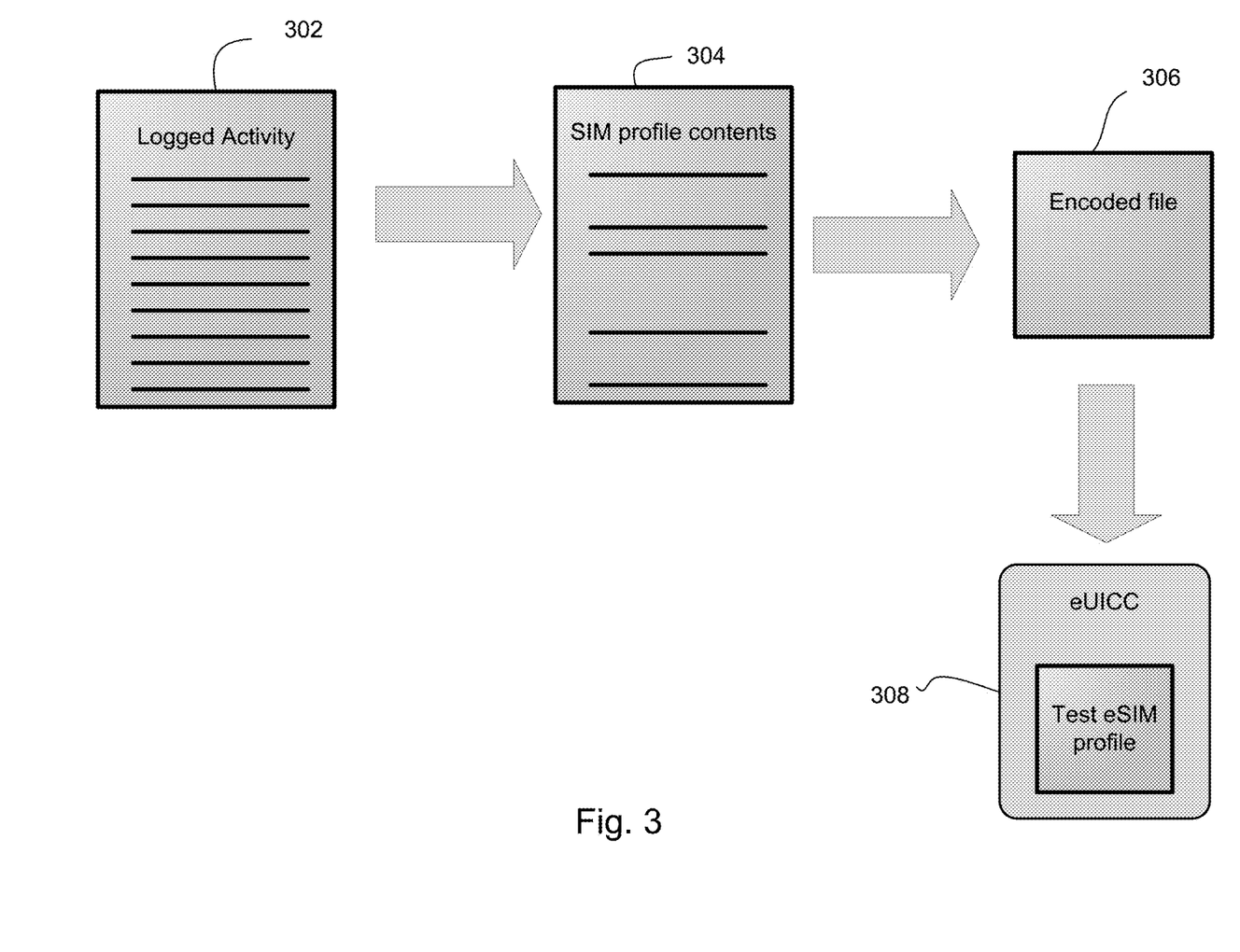
FIG. 3 illustrates creation of a test sSIM profile according to aspects of the disclosure.

FIG. 3 illustrates creation of the test eSIM profile. Logged activity 302 a log of the communications between the SIM and baseband processor during boot-up and network attach. The logged activity 302 may include a plurality of files having different accessibility and restrictions. For example, such files may include common network applications and files defined by international standardization bodies, such as ETSI, 3GPP, 3GPP2, etc. Such files may further include files for cryptographic operations to authenticate the SIM to the network, where these files are not public.

SIM profile contents 304 are extracted from the logged activity 302. For example, the computing device 200 (FIG. 2) may parse through the logged activity 302, selecting particular files to extract. In some cases, the computing device 200 may read the files in the activity log to determine if they contain relevant data. According to some examples, a template may be used to determine which files are extracted. For example, the template may define particular file types, file names, file extensions, or the like to be extracted from the logged activity.

In extracting the SIM profile contents 304 from the logged activity 302, standardized files with READ access condition fulfilled are parsed. Administrator PIN (ADM) protected files will not be read, and proprietary files will not be considered. For example, the test tool may only use artificial authentication values as opposed to real live MNO keys. According to one implementation, because no legitimate secure data can be extracted from the activity log, authentication values should be constant and can be hardcoded to attach to a preferred callbox's configuration. Other files may be omitted or not read, for example based on the template. Examples of files that may be extracted include files relating to roaming information, general files defined by 3GPP or other standards organizations to attach to a 3G network or other types of network, etc.

An encoded file 306 is created from the SIM profile contents 304. For example, the SIM profile contents 304 may be translated into a DER or ASN.1 encoded file. According to some examples, the standardized SIM files may be transposed on-top of a SIM Alliance profile to generate an Unprotected Profile Package (UPP). The resulting UPP will adhere to the SIM Alliance example profile and consider directory files (DF), ADFs, and applications, such as DF Master File, DF Telecom (7F10), ADF USIM as defined in DF_MF/EF_DIR(2F00), DF GSM-Access (5F3B), ADF ISIM as defined in DF_MF/EF_DIR(2F00), ADF CSIM as defined in DF_MF/EF_DIR(2F00), DF MMSS, per 3GPP2, Dummy content may be defined by 3GPP2's "Common Initial Conditions", DF PKCS #15 as defined in DF_MF/EF_DIR(2F00), ARA-M application GP defined AID: A00000015141434C00, ARA-D application GP defined AID: A00000015144414300, etc. In some examples, the UPP will also consider issuer security domain—root (ISD-R) and registry of applets loaded with dummy cap files and equivalent install parameters.

The encoded file 306 is then converted into a format that can be ingested by a server, such as a mobile network operator (MNO). For example, the UPP may follow the procedure defined by GSMA to convert the profile into a bound profile package (BPP) and then downloaded to eUICC 308 as an issuer security domain-profile (ISD-P). The BPP is the profile deliverable that a SM-DP+ server sends to eUICC. The BPP is composed of an Unprotected Profile Package (UPP), a Protected Profile Package (PPP), and the BPP. The PPP may be the UPP segmented into chunks with each "chunk" protected by an AES key (SCP03t) based on the shared certificate between the SM-DP+ server and eUICC. In other examples, the BPP is the entire data blob of PPP, prepended with the details needed at destination eUICC, such as session keys and configuration information. Loading the encoded file 306 onto the eUICC 308 may be performed locally by local profile assistant (LPA), a functional element in the device that provides profile management features, including Profile Download, profile switching, and User Interface features, or via the SM-DP+ server. Even though the UPP is generated with publicly available SIM parameters, an encrypted BPP must be protected by the same certificate CI as exists on the eUICC.

While eUICC is described as the universal format for the present example, it should understood that other universal formats may be used.

Figure 4:
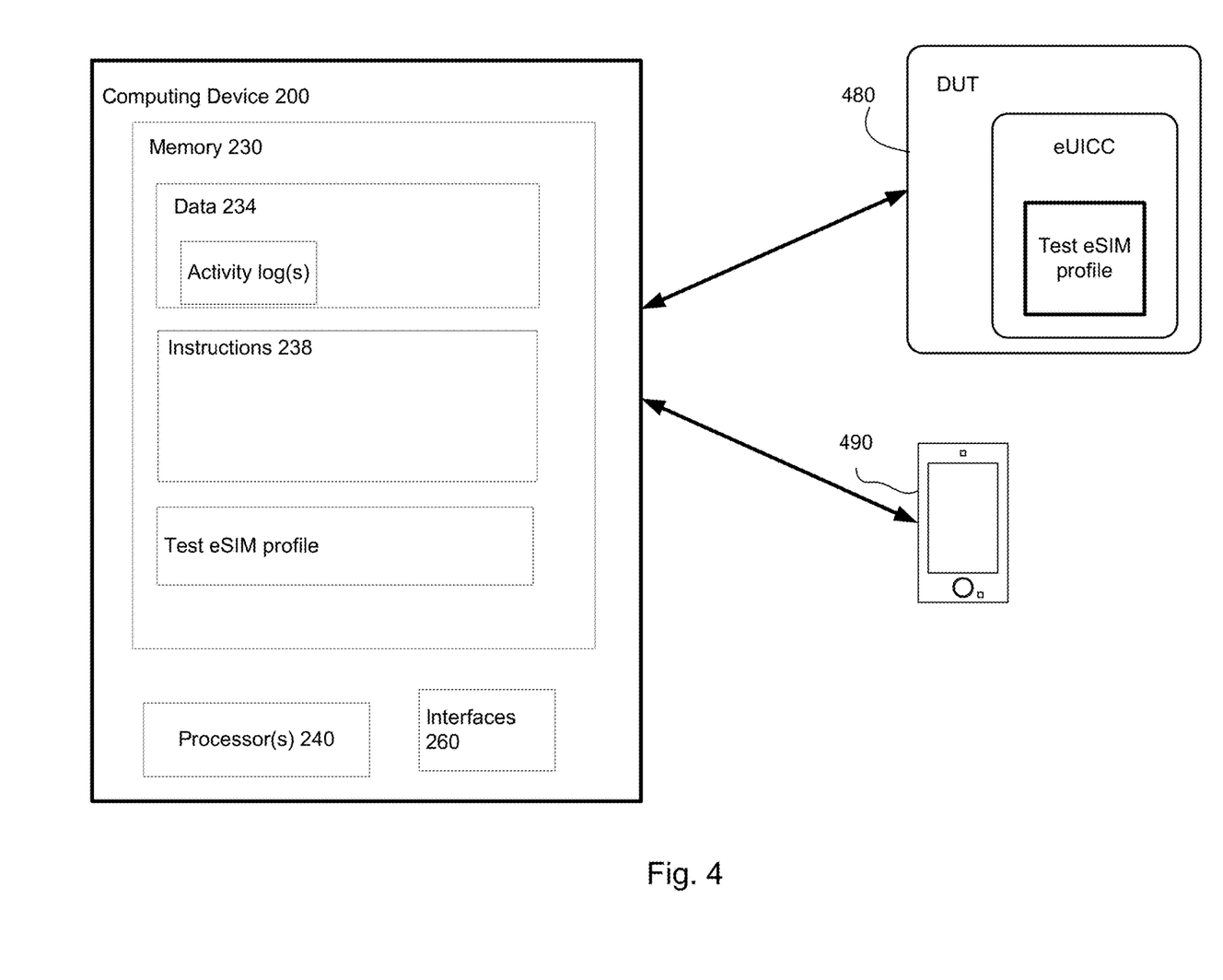
FIG. 4 is a block diagram of an example system according to aspects of the disclosure.

As shown in FIG. 4, eUICC including the test eSIM profile may be used to test and debug other mobile devices 480, 490. For example, a device under test (DUT) 480 may attempt bootup and attachment to a network using the test profile. If the DUT successfully attaches, the DUT 480 may be considered to function properly. As another example, the test profile may be compared to a device profile of the DUT 480. If the test profile matches corresponding elements of the device profile of the DUT 480, the DUT 480 may be considered to function properly.

Example Methods

Figure 5:
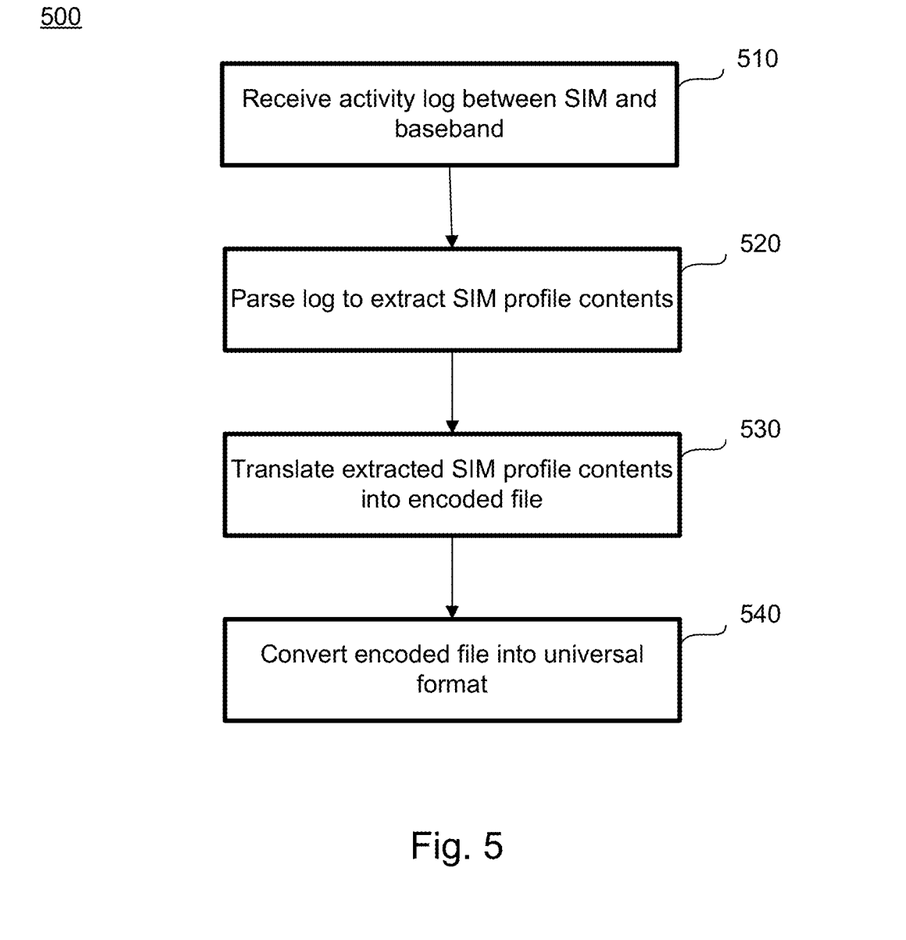
FIG. 5 is a flow diagram illustrating an example method according to aspects of the disclosure.

FIG. 5 provides an example flow diagram illustrating a method 500 for creating a test eSIM profile. While the method 500 is described below in a particular order, it should be understood that operations involved in the method 500 may be handled in a different order or simultaneously, and operations may be added or omitted.

In block 510, a computing device, such as a server, may receive an activity log from a known functioning mobile communication device, e.g. after the device successfully completed an attachment procedure. The activity log may include files and/or other data utilized by the known functioning mobile communication device to boot-up and/or attach to a network. For example, the activity log may include communications between a SIM and a baseband processor of the known functioning mobile communication device. The activity log may be created by the known functioning mobile device, or may be composed by the server computing device having listened in on the communications between the SIM and the baseband processor.

In block 520, the computing device parses the activity log to extract SIM profile contents. For example, the computing device sorts through files with read access set to "on" and selects particular files. In sorting through the files, the computing device may read one or more of the files to determine whether the file is relevant or to extract parts of the file. According to some examples, the computing device may use a template to parse through the activity log, selecting files that correspond to entries in the template.

In block 530, the computing device translates the extracted SIM profile contents into an encoded file. For example, the SIM profile contents may be translated into a distinguished encoding rule (DER) or abstract syntax notation one (ASN.1) encoded file. For example, the profile contents may be a collection of Profile Elements (PEs) that are described in ASN.1 and encoded in tag length value (TLV) structures using DER. According to some examples, the standardized SIM files may be transposed on-top of a SIM Alliance profile to generate an Unprotected Profile Package (UPP).

In block 540, the computing device converts the encoded file into a publicly defined file format designed to be interoperable in all eUICC capable mobile devices. For example, the UPP may follow the procedure defined by GSMA to convert the profile into BPP and then downloaded to eUICC as an issuer security domain-profile (ISD-P). The result is an eUICC or other universally accessible file including a test profile for use in testing other devices that are not yet known to function properly.

The test profile may, for example, be installed on a DUT. Boot-up and network attached for the DUT may be tested using the installed test profile to determine whether operations are preformed correctly. According to other examples, the test profile may be compared to other information extracted from the DUT. For example, SIM profile contents from the DUT may be extracted and compared with those of the known functioning device.

Accordingly, the test profile may be used to facilitate and standardize testing of mobile devices. Profiles, networks, and devices may therefore be validated for a wide variety of configurations, without requiring special permissions or access to secret or secure information.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
    an input/output interface configured to couple to a first mobile communication device; and
    one or more processors configured to:
        receive, from the first mobile communication device, an activity log of activity associated with a sequence of the first mobile communication device, the sequence is at least one of a boot-up sequence or a network attach sequence;
        extract, from the activity log, subscriber identity module (SIM) profile contents;
        translate the SIM profile contents into an encoded file;
    wherein the one or more processors are further configured to output the encoded file to a test embedded universal integrated circuit card (eUICC);
    wherein the activity log comprises communications between a SIM and a baseband processor of the first mobile communication device; and
    wherein extracting the SIM profile contents comprises parsing files of the activity loci permitting read access.

2. The system of claim 1, wherein the test eUICC is configured to be installed on a second mobile computing device for testing.

3. The system of claim 1, wherein translating the SIM profile contents into an encoded file comprises transposing SIM files on-top of a SIM Alliance profile.

4. The system of claim 1, wherein the one or more processors are further configured to convert the encoded file into a publicly defined file format.

5. The system of claim 4, wherein the publicly defined file format is a bound profile package (BPP).

6. The system of claim 1, wherein parsing the files comprises applying a predefined template to the activity log.

7. A method, comprising:
    receiving, with one or more processors from a first mobile communication device, an activity log of activity associated with a sequence of the first mobile communication device, the sequence is at least one of a boot-up sequence or a network attach sequence;
    extracting, with the one or more processors, subscriber identity module (SIM) profile contents from the activity log;
    translating, with the one or more processors, the SIM profile contents into an encoded file;
    outputting the encoded file to a test embedded universal integrated circuit card (eUICC);
    wherein receiving the activity loci comprises listening to communications between a SIM and a baseband processor of the first mobile communication device; and
    wherein extracting the SIM profile contents comprises parsing files of the activity loci permitting read access.

8. The method of claim 7, wherein translating the SIM profile contents into an encoded file comprises transposing SIM files on-top of a SIM Alliance profile.

9. The method of claim 7, further comprising converting the encoded file into a publicly defined file format.

10. The method of claim 7, wherein parsing the files comprises applying a predefined template to the activity log.

11. A non-transitory computer-readable medium storing instructions executable by one or more processors to perform a method, comprising:
    receiving, from a first mobile communication device, an activity log of activity associated with a sequence of the first mobile communication device, the sequence is at least one of a boot-up sequence or a network attach sequence;
    extracting subscriber identity module (SIM) profile contents from the activity log;
    translating the SIM profile contents into an encoded file;
    outputting the encoded file to a test embedded universal integrated circuit card (eUICC);
    wherein the activity log comprises communications between a SIM and a baseband processor of the first mobile communication device; and
    wherein extracting the SIM profile contents comprises parsing files of the activity loci permitting read access.

\* \* \* \* \*